United States Patent
Hague et al.

(10) Patent No.: US 8,738,241 B2
(45) Date of Patent: May 27, 2014

(54) PUMP OVERSPEED PROTECTION METHOD AND MACHINE USING SAME

(75) Inventors: Michael Evan Hague, Yorkville, IL (US); Sameer Marathe, Yorkville, IL (US); Zhiyong Wei, Naperville, IL (US); Matthew Stephen Marquette, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 534 days.

(21) Appl. No.: 13/118,866

(22) Filed: May 31, 2011

(65) Prior Publication Data

US 2012/0310489 A1    Dec. 6, 2012

(51) Int. Cl.
*F04B 49/00* (2006.01)
*F04B 17/05* (2006.01)
*G06F 19/00* (2011.01)

(52) U.S. Cl.
USPC .............. 701/50; 60/445; 60/449; 60/435; 60/431; 417/212; 417/216; 417/231; 417/223

(58) Field of Classification Search
USPC .............. 701/50; 417/212, 216, 231, 223, 42; 60/327, 421, 445, 449, 459, 428, 426, 60/430, 435, 431, 419, 574
See application file for complete search history.

(56) References Cited

U.S. PATENT DOCUMENTS

| | | | |
|---|---|---|---|
| 3,999,386 A | 12/1976 | Crull et al. | |
| 5,435,131 A | 7/1995 | Hausman et al. | |
| 5,996,343 A | 12/1999 | Kuras | |
| 6,385,970 B1 * | 5/2002 | Kuras et al. | 60/448 |
| 6,537,177 B2 | 3/2003 | Degroot et al. | |
| 6,620,077 B2 | 9/2003 | Carlson et al. | |
| 7,693,642 B2 | 4/2010 | Anderson et al. | |
| 2002/0115531 A1 * | 8/2002 | Degroot et al. | 477/92 |
| 2013/0098019 A1 * | 4/2013 | Opdenbosch et al. | 60/327 |

* cited by examiner

*Primary Examiner* — Christine Behncke
(74) *Attorney, Agent, or Firm* — Liell & McNeil (57) ABSTRACT

A machine having a pump overspeed protection system operating thereon includes an internal combustion engine, a plurality of ground engaging elements, and a drivetrain coupling the internal combustion engine and the ground engaging elements. The drivetrain includes a torque converter having a locked configuration and an unlocked configuration. The machine also includes a plurality of pumps driven by the internal combustion engine. An electronic control is in communication with the internal combustion engine, the torque converter, and the plurality of pumps. The electronic controller is configured to determine a pump speed of a first pump of the plurality of pumps, initiate a first action of a hierarchy of pump overspeed protection actions if the pump speed exceeds a first speed threshold, initiate a second action of the hierarchy of pump overspeed protection actions if the pump speed exceeds a second speed threshold, initiate a third action of the hierarchy of pump overspeed protection actions if the pump speed exceeds a third speed threshold, and monitor a condition of a component altered by at least one of the hierarchy of pump overspeed protection actions. At least one of the hierarchy of pump overspeed protection actions includes increasing a displacement of at least one of the plurality of pumps and at least another of the hierarchy of pump overspeed protection actions includes moving the torque converter from the locked configuration to the unlocked configuration.

20 Claims, 5 Drawing Sheets

| Pump Speed | Power |
|---|---|
| 2239 | 0 |
| 2244 | 1 |
| 2250 | 3 |
| 2255 | 6 |
| 2261 | 9 |
| 2266 | 12 |
| 2272 | 62 |
| 2277 | 93 |
| 2283 | 161 |
| 2289 | 264 |
| 2294 | 388 |
| 2300 | 480 |
| 2305 | 480 |
| 2311 | 480 |
| 2316 | 480 |

Figure 7

PUMP OVERSPEED PROTECTION METHOD AND MACHINE USING SAME

TECHNICAL FIELD

The present disclosure relates generally to a pump overspeed protection method, and more particularly to performing a hierarchy of pump overspeed protection actions as pump speed increases and monitoring a condition of a component altered by at least one of the hierarchy of pump overspeed protection actions.

BACKGROUND

On-highway and off-highway machines have engines, drivetrains, and other engine driven equipment, including pumps, which are susceptible to damage when operated at excessive speeds. Typically, the engine experiences a resistive load from the ground engaging elements, such as wheels or tracks, of the machine, and other final drive elements of the drivetrain of the machine. However, there may be times when the resistive load becomes a load that drives the engine. Such a condition may result, for example, from deceleration or traveling down a grade. More specifically, for example, this condition may occur when a machine is in gear and the weight of the load creates momentum sufficient to backload through the drivetrain and increase the engine speed. This increased engine speed may be above the normal speed range for the engine and may significantly decrease the life of the engine and attached components.

U.S. Pat. No. 3,999,386 to Crull et al. teaches an overspeed protection control for an engine driving at least one pump. The control includes hydro-mechanical valve means operable to cause an increase in pressure in a circuit supplied by the pump in response to an excessive engine speed. The increase in pressure results in an increase in load torque on the engine, thus reducing engine speed.

The present disclosure is directed to one or more of the problems set forth above.

SUMMARY OF THE DISCLOSURE

In one aspect, a machine having a pump overspeed protection system operating thereon includes an internal combustion engine, a plurality of ground engaging elements, and a drivetrain coupling the internal combustion engine and the ground engaging elements. The drivetrain includes a torque converter having a locked configuration and an unlocked configuration. The machine also includes a plurality of pumps driven by the internal combustion engine. An electronic control is in communication with the internal combustion engine, the torque converter, and the plurality of pumps. The electronic controller is configured to determine a pump speed of a first pump of the plurality of pumps, initiate a first action of a hierarchy of pump overspeed protection actions if the pump speed exceeds a first speed threshold, initiate a second action of the hierarchy of pump overspeed protection actions if the pump speed exceeds a second speed threshold, initiate a third action of the hierarchy of pump overspeed protection actions if the pump speed exceeds a third speed threshold, and monitor a condition of a component altered by at least one of the hierarchy of pump overspeed protection actions. At least one of the hierarchy of pump overspeed protection actions includes increasing a displacement of at least one of the plurality of pumps and at least another of the hierarchy of pump overspeed protection actions includes moving the torque converter from the locked configuration to the unlocked configuration.

In another aspect, a pump overspeed protection method includes a step of determining a pump speed of a first pump. A first action of a hierarchy of pump overspeed protection actions is electronically initiated using an electronic controller if the pump speed exceeds a first speed threshold. A second action of the hierarchy of pump overspeed protection actions is initiated using the electronic controller if the pump speed exceeds a second speed threshold. A third action of the hierarchy of pump overspeed protection actions is initiated using the electronic controller if the pump speed exceeds a third speed threshold. The method also includes monitoring a condition of a component altered by at least one of the hierarchy of pump overspeed protection actions.

In yet another aspect, a machine having a pump overspeed protection system operating thereon includes an internal combustion engine, a plurality of ground engaging elements, and a drivetrain coupling the internal combustion engine and the ground engaging elements. The drivetrain includes a torque converter having a locked configuration and an unlocked configuration. An electronic controller is in communication with the internal combustion engine, the torque converter, and a plurality of pump driven by the internal combustion engine. The electronic controller is configured to determine a pump speed of a first pump of the plurality of pumps, increase a displacement of a fan pump if the pump speed exceeds a first speed threshold, increase a displacement of an implement pump if the pump speed exceeds a second speed threshold, and move the torque converter from the locked configuration to the unlocked configuration if the pump speed exceeds a third speed threshold.

DETAILED DESCRIPTION

Figure 1:
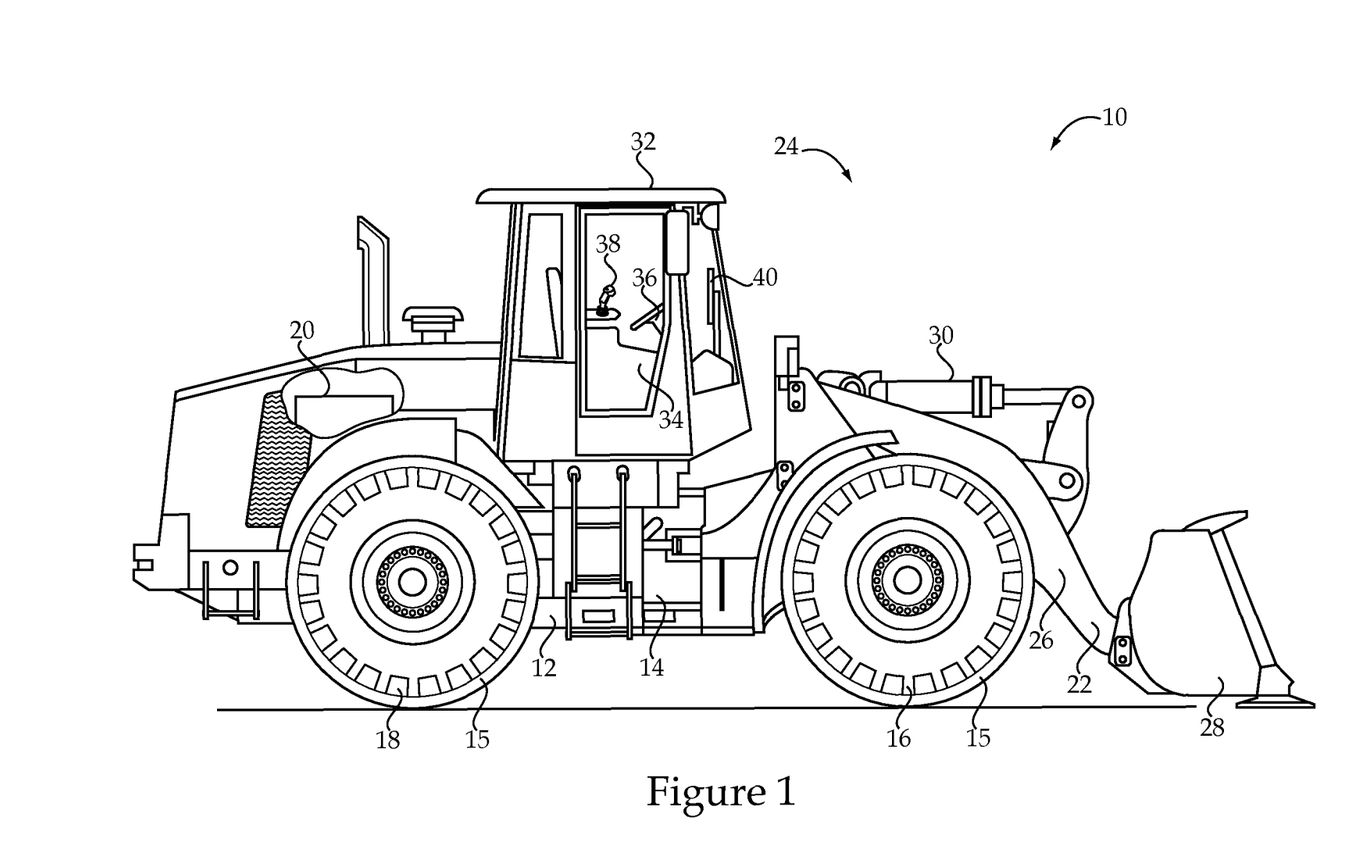
FIG. 1 is a side diagrammatic view of a machine, according to the present disclosure.

An exemplary embodiment of a machine 10 is shown generally in FIG. 1. The machine 10 may be a wheel loader, as shown, or any other on-highway or off-highway vehicle used to perform work operations. In the illustrated embodiment, machine 10 includes a machine body 12 having a drivetrain 14 supported thereon for driving ground engaging elements 15 of the machine 10, such as, for example, front wheels 16 or rear wheels 18. Drivetrains, also known as powertrains, typically receive power from an internal combustion engine 20, or other power source, and transmit that power to the one or more ground engaging elements 15 using any known means. An exemplary drivetrain 14 for propelling machine 10 will be discussed in greater detail below.

The internal combustion engine 20 may also provide power for one or more implements, such as a loader 22, attached to the machine body 12 at a front end 24 of the machine 10. The loader 22 may include a pair of arms 26 movably attached to the front end 24 of the machine body 12. The pair of arms 26 may be moved upward and downward in order to lift and lower a bucket 28. The bucket 28, useful in supporting a payload material, may be movably attached to the pair of arms 26, and may be tilted about a horizontal axis. As is known in the art, one or more hydraulic cylinders 30 may be positioned to control movement of each aspect of the loader 22, such as, for example, moving the pair of arms 26 and tilting the bucket 28. As such, the internal combustion engine 20 may provide power to a hydraulic system, discussed below with reference to FIG. 2, which supplies pressurized hydraulic fluid to the one or more hydraulic cylinders 30.

An operator control station 32 may be mounted to the machine body 12 and may include common devices, such as, for example, a seat assembly 34 and a steering device 36 that facilitate operator control. The operator control station 32 may include various other devices, including, but not limited to, one or more machine operation controllers. For example, a machine operation controller may be provided for controlling movement of an implement, such as the loader 22, of the machine 10. In addition, a machine operation controller may be provided for controlling a direction of movement of the machine 10, such as a forward, neutral, or reverse direction. The operator control station 32 may also include an operator engine speed selection device 38, such as, for example, a throttle, for selecting an engine speed of the internal combustion engine 20. An operator display 40 may be positioned within the operator control station 32 and may display information relating to performance of the machine 10. Additional controls and devices, as should be appreciated, may also be provided within the operator control station 32.

Figure 2:
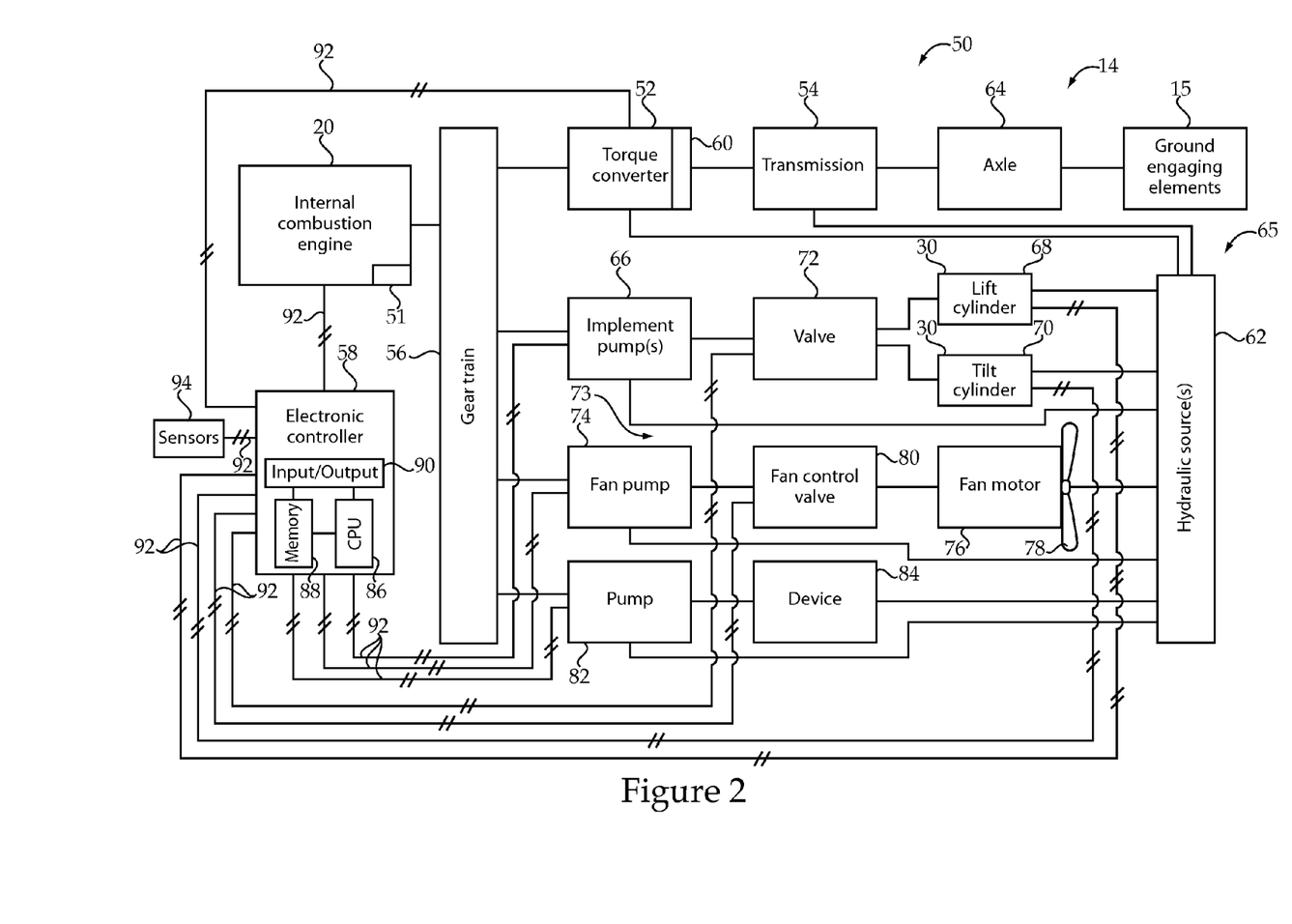
FIG. 2 is a block diagram of an exemplary control system for the machine of FIG. 1, according to one aspect of the present disclosure.

Turning now to FIG. 2, an exemplary control system for controlling the internal combustion engine 20, and other components, of machine 10 is shown generally at 50. The internal combustion engine 20 may include a compression release engine braking mechanism 51 having a conventional design and being configured to open one or more exhaust valves of the engine 20 at appropriate times to release compressed air from piston cylinders of the engine 20. According to the exemplary embodiment, the drivetrain 14 may include a torque converter 52 that is operably positioned between the internal combustion engine 20 and a transmission 54. More specifically, the torque converter 52 may be driven by the internal combustion engine 20 through a gear train 56 and may be controlled, at least in part, by electronic controller 58 to transmit power to transmission 54, which may preferably be an automatic transmission.

According to conventional design, the torque converter 52 may include an input member operably coupled to the internal combustion engine 20, a pump, an output member operably coupled to the transmission 54, a turbine, and a lock-up clutch 60. One or more sources of hydraulic oil 62, or other suitable fluid, may be fluidly connected to both the pump of the torque converter 52 and the transmission 54. The torque converter 52 may be utilized in a conventional manner to convert hydraulic pressure into mechanical torque which can drive the ground engaging elements 15 by rotating axle 64. More specifically, the torque converter 52 may be positioned such that the internal combustion engine 20 drives the pump, which in turn drives the turbine via the fluid connection. The turbine is operably connected to the transmission 54, which in turn drives the ground engaging elements 15.

When the lock-up clutch 60, also of conventional design, is engaged, in a locked configuration of the torque converter 52, the internal combustion engine 20 or, more specifically, the engine crank shaft is directly coupled to the transmission 54 so that both rotate at the same rate. When the lock-up clutch 60 is disengaged, in an unlocked configuration of the torque converter 52, the engine crank shaft is operably coupled to the transmission 54 via the torque converter 52 so that the shafts of the two components can rotate at different rates according to the desired torque to be transmitted to the ground engaging elements 15. As should be appreciated, it may be desirable to engage the lock-up clutch 60 at certain speeds and during certain modes of operation of machine 10, and disengage the lock-up clutch 60 at a different range of speeds and/or during different modes of operation. For example, the lock-up clutch 60, which may be electronically controlled by the electronic controller 58, may be engaged to eliminate slippage above a specified speed.

The machine 10 or, more specifically, a hydraulic system 65 of machine 10 may also include one or more implement pumps, such as implement pump 66 driven by internal combustion engine 20, that serve to supply hydraulic oil from one or more sources 62 to cylinders or drives, such as, for example, a boom cylinder 68 and a bucket cylinder 70, described above with reference to cylinders 30 in FIG. 1. The implement pump 66 may be a swash plate type variable displacement pump, the angles of which may be controlled by control signals from the electronic controller 58. Hydraulic oil discharged from the implement pump 66 may be supplied to the boom cylinder 68 and bucket cylinder 70 via one or more valves, such as a main valve 72. The main valve 72 may supply hydraulic oil discharged from the implement pump 66 to the boom cylinder 68 and the bucket cylinder 70 in response to input from operator controls, which may be positioned within the operator control station 32.

The hydraulic system 65 may also include a fan drive system 73. The fan drive system 73 may include a variable displacement pump 74, which receives fluid from one or more hydraulic sources 62, and a fluid motor 76 that drives a cooling fan 78. The cooling fan 78, as should be appreciated, may be operative to provide cooling air through a heat exchanger. It should also be appreciated that the heat exchanger may have various fluids directed therethrough for cooling, such as water, hydraulic oil, transmission fluid, etc. The displacement of the fan pump 74, which may be a load sensing pump, may be controlled by a fan control valve 80. The fan control valve 80, which may be a proportional solenoid valve, may be movable between minimum and maximum displacement positions and may be controlled using control signals from the electronic controller 58.

As should be appreciated, the hydraulic system 65 may include additional devices, including, for example, pumps, filters, coolers, valves, and the like, for hydraulically controlling the systems and components described above and additional systems and components of machine 10. As shown, the hydraulic system 65 may include at least an additional engine driven pump 82 supplying hydraulic oil to an additional device or component 84 of machine 10. For example, the additional engine driven pump 82 may be steering pump, a lubricating oil pump, or any of a variety of other known pumps.

The electronic controller 58 may be of standard design and may include a processor, such as, for example, a central processing unit 86, a memory 88, and an input/output circuit 90 that facilitates communication internal and external to the electronic controller 58. The processor 86, for example, may control operation of the electronic controller 58 by executing operating instructions, such as, for example, computer readable program code stored in the memory 88, wherein operations may be initiated internally or externally to the electronic controller 58. Control schemes may be utilized that monitor outputs of systems or devices, such as, for example, sensors, actuators, or control units, via the input/output circuit to control inputs to various other systems or devices. The memory 88, as used herein, may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. One skilled in the art will appreciate that any computer based system or device utilizing similar components for controlling the machine systems or components described herein, is suitable for use with the present disclosure.

The electronic controller 58 may communicate with various systems and components of the machine 10 via one or more wired and/or wireless communications lines 92, or other similar input/output circuits. For example, regarding the control system 50, the electronic controller 58 may communicate with at least the internal combustion engine 20, the torque converter 52, pumps 66, 74, and 82, and valves 72 and 80. Sensors 94, which may also communicate with the electronic controller 58 via communications lines 92, may represent a variety of sensors used by the electronic controller 58 to monitor and control operation of the machine 10. For example, sensors 94 utilized by the control strategies provided herein may include temperature, pressure, and speed sensors, as are known in the art.

Figure 3:
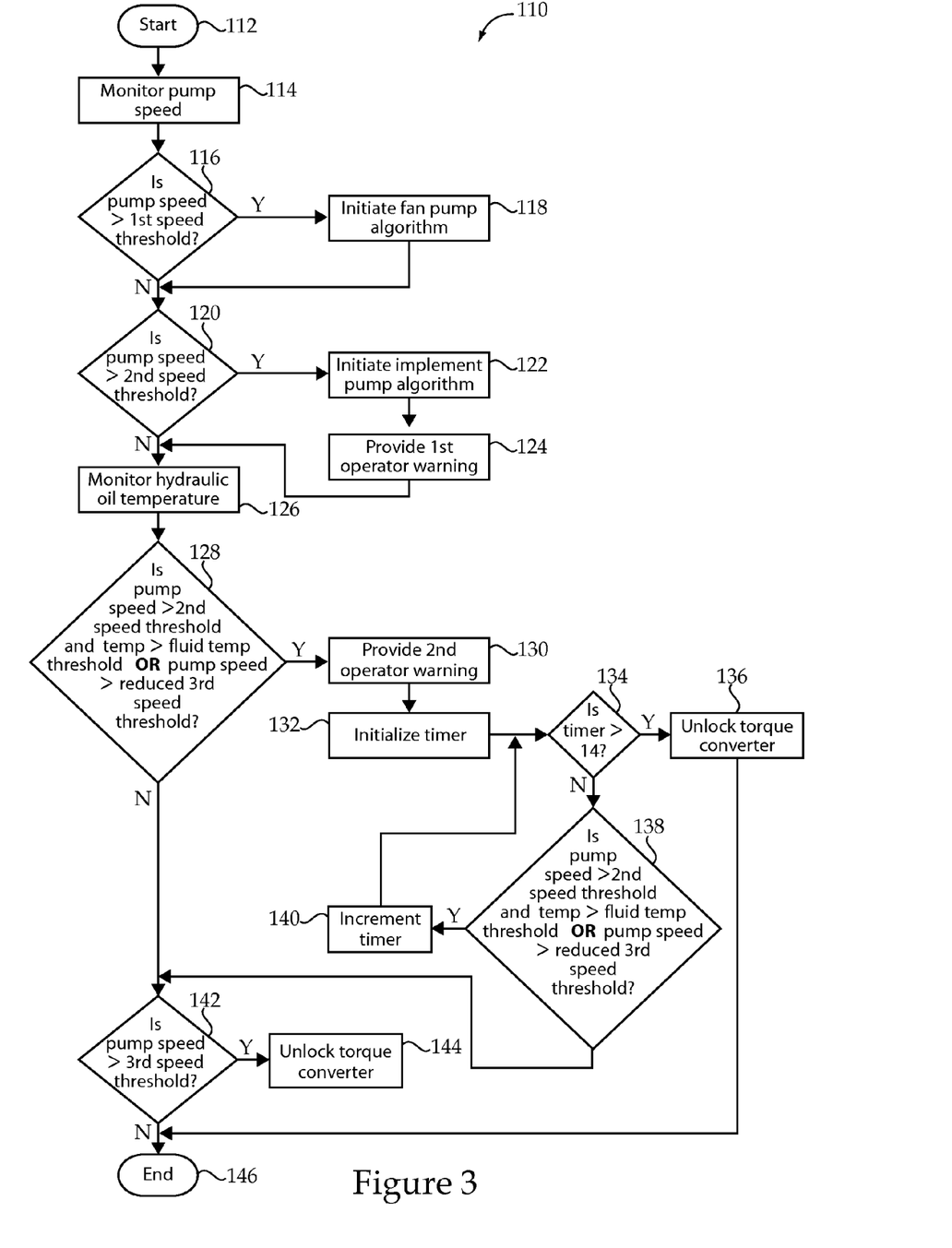
FIG. 3 is a logic flow chart of one embodiment of a pump overspeed protection method, as may be implemented by the control system of FIG. 2, according to another aspect of the present disclosure.

Turning now to FIG. 3, and referring also to FIGS. 1 and 2, there is shown a logic flow diagram 110 representing an exemplary pump overspeed protection method for the machine 10, according to the present disclosure. The method may be implemented by the electronic controller 58, or similar electronic control system, of the machine 10. According to one example, the steps implementing the disclosed method may be in the form of computer readable program code stored in the memory 88 of the electronic controller 58 and executed by the processor 86 of the electronic controller 58, or other computer usable medium. The method may run continuously or may be initiated in response to one or more predetermined events, as described below.

The method begins at a START, Box 112. From Box 112, the method proceeds to Box 114, which includes the step of monitoring a pump speed. Specifically, according to one embodiment, the electronic controller 58 may monitor the speed of one of more of pumps 66, 74, and 82, such as by detecting an output speed. Alternatively, the electronic controller 58 may determine the speed of one or more of pumps 66, 74, and 82 by detecting or sensing the speed of the internal combustion engine 20, such as by using an engine speed sensor of sensors 94, and calculating a corresponding speed of the pumps 66, 74, 82 based on gear ratios of gear train 56. Thus, the present method may begin by monitoring either of an engine speed or a corresponding pump speed. Although either engine speed or pump speed may be used, the disclosed method is described with reference to pump speed.

Figure 4:
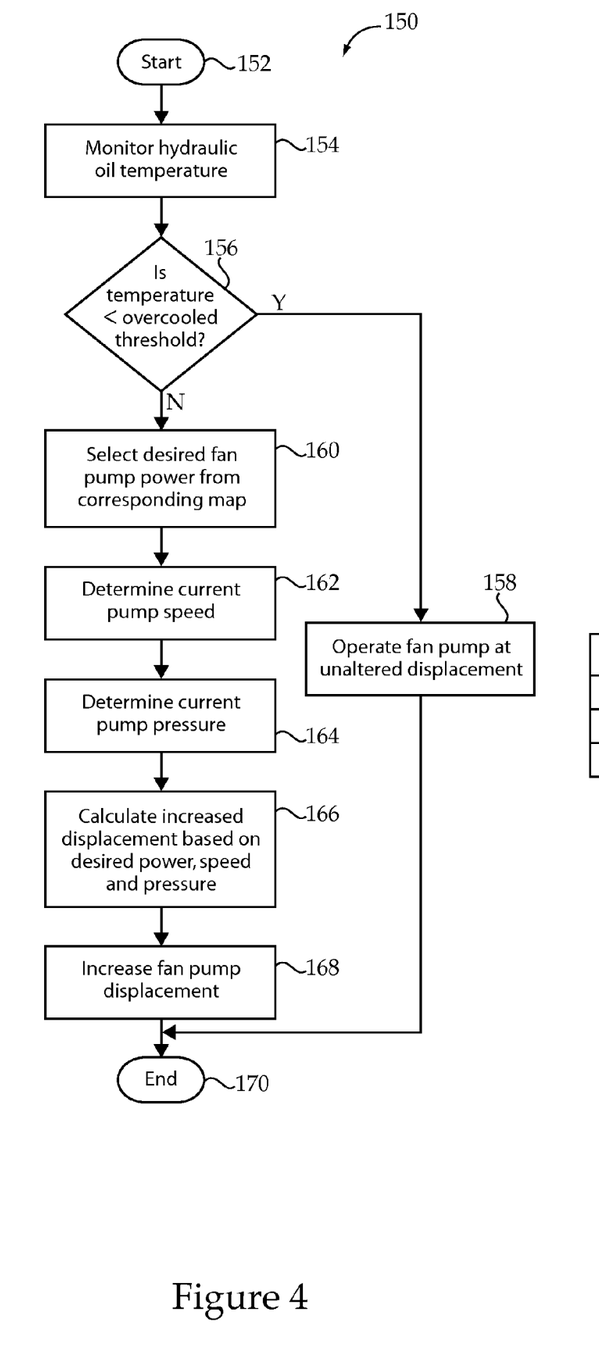
FIG. 4 is a logic flow chart of one embodiment of a fan pump algorithm, which may be initiated by the pump overspeed protection method of FIG. 3, according to another aspect of the present disclosure.

At Box 116, the electronic controller 58 may determine if the pump speed determined above is greater than a first speed threshold. The first speed threshold may correspond to a speed of at least one of pumps 66, 74, and 82 at which it is desired to initiate a first overspeed protection action. If engine speed is monitored, it should be appreciated that the first speed threshold may represent an engine speed that corresponds to the pump speed threshold. According to one example, the first speed threshold may correspond to a pump speed of about 2300 revolutions per minute (RPM). If the pump speed is greater than the first speed threshold, the method may proceed to Box 118, where a fan pump algorithm, discussed below with reference to FIG. 4, is initiated.

Figure 6:
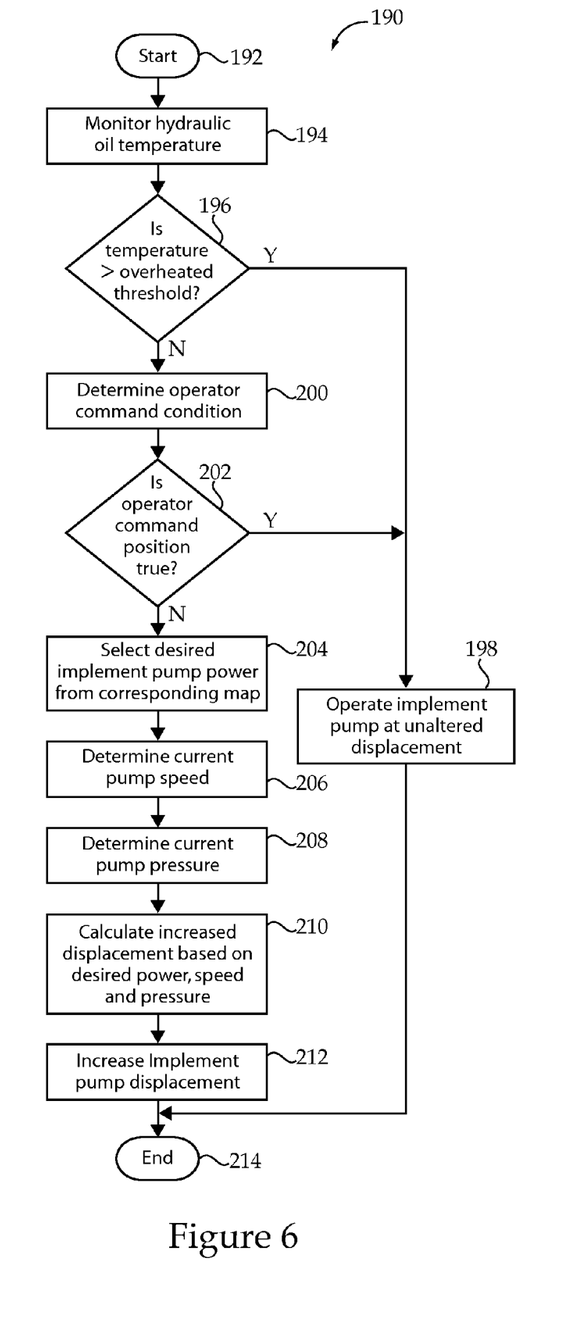
FIG. 6 is a logic flow chart of one embodiment of an implement pump algorithm, which may be initiated by the pump overspeed protection method of FIG. 3, according to another aspect of the present disclosure.

The method continues to Box 120, where the electronic controller 58 determines if the pump speed is greater than a second speed threshold. The second speed threshold may correspond to a speed of at least one of pumps 66, 74, and 82 at which it is desired to initiate a second overspeed protection action. According to a specific example, the second speed threshold may be about 2360 RPM. If the pump speed is greater than the second speed threshold, the method may proceed to Box 122, where an implement pump algorithm, discussed below with reference to FIG. 6, is initiated. If the pump speed is greater than the second speed threshold, the electronic controller 58 may also provide a first operator warning, at Box 124. For example, a visual warning may be displayed on the operator display 40 to notify the operator that the second speed threshold has been met and/or exceeded. The warning may also instruct the operator to take appropriate countermeasures to slow the engine speed and, thus, pump speed. For example, the warning may instruct the operator to apply any available machine brakes. As should be appreciated, any visual and/or audible warnings may be used, and may be provided at alternative thresholds than those described herein.

The method proceeds to Box 126, where hydraulic oil temperature is monitored. Specifically, sensors 94 may include a temperature sensor positioned to sense a temperature of hydraulic oil circulating through the hydraulic system 65. At Box 128, the method determines whether the pump speed is above the second speed threshold and the sensed temperature is above a fluid temperature threshold OR the pump speed is above a reduced third speed threshold. The fluid temperature threshold, such as, for example, 90 degrees Celsius, may correspond to a hydraulic oil temperature at which, or above which, it may be desired to provide a second operator warning and/or perform a third overspeed protection action, if the pump speed is excessive. The reduced third speed threshold, which may be, for example, 2390 RPM, may be greater than the second speed threshold but less than a third speed threshold.

If either of the conditions evaluated at Box 128 are true, the method proceeds to Box 130, where a second operator warning is displayed on the operator display 40. The second operator warning may also include a visual or audible warning and may inform the operator as to what actions are being automatically taken to reduce the engine speed and, thus, pump speed, and may also instruct the operator to take appropriate countermeasures. A timer is then initialized, at Box 132. The method may continue to increment the timer (Box 140) if either of the conditions evaluated first at Box 128 are true (Box 138) until the timer reaches a predetermined time, such as, for example, 15 seconds. If the timer is greater than 14 seconds, the method proceeds to Box 136, where the torque converter 52 is moved to an unlocked configuration. Specifically, the lock-up clutch 60 may be disengaged, as described above, such that the engine crank shaft is operably coupled to the transmission 54 via the torque converter 52.

If neither of the conditions monitored at Box 128, or again at Box 138, are true, the method proceeds to Box 142, where the electronic controller 58 determines whether the pump speed is greater than a third speed threshold. The third speed threshold, such as, for example, 2460 RPM, may correspond to a speed of at least one of pumps 66, 74, and 82 at which it is desired to initiate a third overspeed protection action. If the pump speed is greater than the third speed threshold, the method proceeds to Box 144, where the torque converter 52 is moved to the unlocked configuration. If the pump speed is not greater than the third speed threshold, the method proceeds to an END, at Box 146. As stated above, the method may run continuously or at predetermined intervals by the electronic controller 58.

According to an alternative embodiment, the method may also include operating the compression release engine braking mechanism 51 if the pump speed exceeds an additional speed threshold. The compression release engine braking mechanism 51 may be performed in addition to the actions provided above or may be performed as an alternative to any of the actions. As such, operating the compression release engine braking mechanism 51, if the engine 20 is so equipped, may be done at any desired pump speed threshold. As should be appreciated, the pump speed thresholds, at which the hierarchy of pump overspeed protection actions are initiated, may vary depending on particular pump specifications and design preferences.

Turning now to FIG. 4, the fan pump algorithm, initiated at Box 118 of the method of FIG. 3, is shown as a logic flow diagram at 150. The algorithm begins at a START, Box 152. From Box 152, the algorithm proceeds to Box 154, which includes the step of monitoring hydraulic oil temperature. Specifically, sensors 94 may include a temperature sensor positioned to sense a temperature of hydraulic oil circulating through all or a portion of the hydraulic system 65. At Box 156, the algorithm determines whether the sensed temperature is below an overcooled threshold. The overcooled threshold may represent a temperature below which it is desired to inhibit performance of the fan pump algorithm described herein. For example, the overcooled threshold may represent a temperature below which the hydraulic oil may experience an increased viscosity that may compromise flow. The overcooled threshold may be very low, such as, for example, −20 degrees Celsius. If the temperature is below the overcooled threshold, the fan pump 74, which may contribute to the cooling of the hydraulic oil, will be operated at an unaltered displacement, at Box 158. An "unaltered displacement," as used herein, may represent a pump displacement commanded by the electronic controller 58 during normal operation of the machine 10. Thus, the unaltered displacement is not adjusted by the pump overspeed protection method described herein.

Figure 5:
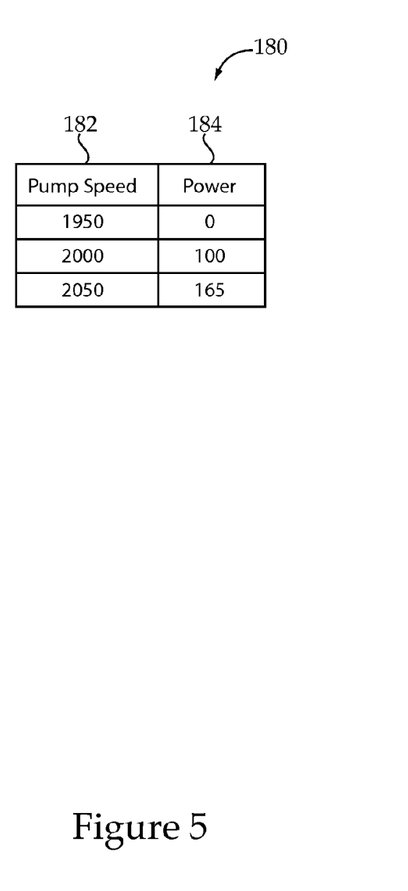
FIG. 5 is a table that relates pump speed to desired power across an operating range of a fan pump, according to another aspect of the present disclosure.

If the sensed temperature of the hydraulic oil is not below the overcooled threshold, the algorithm proceeds to Box 160, where a desired fan pump power is selected from a map, such as map 180 of FIG. 5. The map 180 may be stored in memory 88 and may relate fan pump speed, shown in column 182, to desired power, shown in column 184, across an operating range of the fan pump 74. The values provided in map 180 are provided as examples only, and may be determined, such as by testing, to represent the minimum power required (column 184) for retarding at the given speed (column 182). As will become apparent below, if the fan pump 74 is already providing an amount of power greater than the desired power value selected from the map 180, it may not be desirable to continue the fan pump algorithm.

At Box 162, the current speed of the fan pump 74 is determined. Specifically, the electronic controller 58 may monitor the speed of the fan pump 74 or may determine the speed of the fan pump 74 by detecting the speed of the internal combustion engine 20 and calculating the fan pump speed based on a gear ratio provided by gear train 56. As such, sensors 94 may include one or more speed sensors used to determine the current speed of fan pump 74. A current pressure of the fan pump 74 is also determined, at Box 164. For example, sensors 94 may include a pressure sensor positioned to detect the fan pump pressure. An increased displacement is then calculated at Box 166 based on the desired fan pump power selected from the map 180, the current pump speed, and the current pump pressure, where power=pump speed*pump displacement*pump pressure.

The displacement of the fan pump 74 is then increased, at Box 168, to the increased displacement value calculated at Box 166. Specifically, according to the exemplary embodiment, the fan pump displacement may be increased by sending an appropriate control signal from the electronic controller 58 to the fan control valve 80. After increasing the fan pump displacement at Box 168, or operating the fan pump 74 at an unaltered displacement at Box 158, the algorithm proceeds to an END, at Box 170.

Turning now to FIG. 6, the implement pump algorithm, initiated at Box 122 of the method of FIG. 3, is shown as a logic flow diagram at 190. The algorithm begins at a START, Box 192. From Box 192, the algorithm proceeds to Box 194, which includes the step of monitoring hydraulic oil temperature. Specifically, sensors 94 may include a temperature sensor positioned to sense a temperature of hydraulic oil circulating through the hydraulic system 65 or, more specifically, a hydraulic circuit including the implement pump 66. At Box 196, the algorithm determines whether the sensed temperature is above an overheated threshold. The overheated threshold may represent a temperature above which it may be desired to inhibit performance of the implement pump algorithm described herein. For example, it may be determined that if the hydraulic oil temperature exceeds around 140 degrees Celsius, the implement pump algorithm, which may contribute to increased heating of the hydraulic oil, will not be performed. Thus, if the temperature is above the overheated threshold, the implement pump 66, and any additional implement pumps, will be operated at an unaltered displacement, at Box 198.

If the sensed temperature of the hydraulic oil is not above the overheated threshold, the algorithm proceeds to Box 200, which includes the step of determining an operator command condition. Specifically, the operator command condition may be determined by monitoring one or more sensors or circuits associated with the cylinders 30 of machine 10 to determine whether an operator is commanding use of the implement, such as, for example, loader 22. The determination, which may include a margin of error, may be either true (i.e., operator is commanding the implement) or false (i.e., operator is not commanding the implement). If the operator command condition is true, at Box 202, the algorithm proceeds to Box 198, where the implement pump 66, and any additional implement pumps, will be operated at the unaltered displacement.

Figure 7:
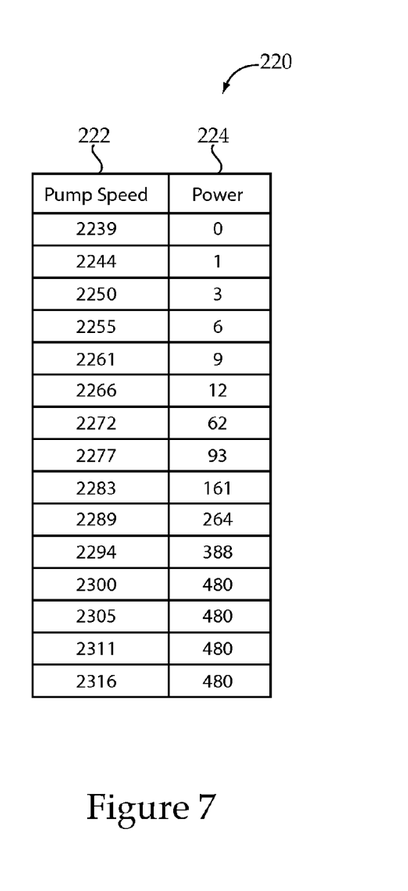
FIG. 7 is a table that relates pump speed to desired power across an operating range of an implement pump, according to another aspect of the present disclosure.

If the operator command condition is false, the algorithm proceeds to Box 204, where a desired implement pump power is selected from a map, such as map 220 of FIG. 7. The map 220 may be stored in memory 88 and may relate implement pump speed, shown in column 222, to desired power, shown in column 224, across an operating range of the implement pump 66. The values provided in map 220 are provided as examples only, and may represent the minimum power required (column 224) for retarding the engine 20 at the given speed (column 222). As will become apparent below, if the implement pump 66 is already providing an amount of power greater than the desired power value selected from the map 220, it may be desirable to discontinue performance of the algorithm.

At Box 206, the current speed of the implement pump 66 is determined. Specifically, the electronic controller 58 may monitor the speed of the implement pump 66 or may determine the speed of the implement pump 66 by detecting the speed of the internal combustion engine 20 and calculating the implement pump speed based on a gear ratio provided by gear train 56. As such, sensors 94 may include one or more speed sensors used to determine the current speed of implement pump 66. A current pressure of the implement pump 66 is also determined, at Box 208. For example, sensors 94 may include a pressure sensor positioned to detect the fan pump pressure. An increased displacement is then calculated at Box 210 based on the desired implement pump power selected from the map 220, the current pump speed, and the current pump pressure, where power=pump speed*pump displacement*pump pressure.

The displacement of the implement pump 66, and any additional implement pumps, is then increased, at Box 212, to the increased displacement value calculated at Box 210. Specifically, according to the exemplary embodiment, the implement pump displacement may be increased by sending an appropriate control signal from the electronic controller 58 to the implement pump 66. After increasing the implement pump displacement at Box 212, or operating the implement pump 66 at an unaltered displacement at Box 198, the method proceeds to an END, at Box 214.

INDUSTRIAL APPLICABILITY

The present disclosure may be applicable to machines having a plurality of engine driven pumps and a drivetrain coupling the engine with ground engaging elements. Further, the present disclosure may be applicable to such machines having conditions wherein at least one of the pumps is driven by reverse torque through the drivetrain. Yet further, the present disclosure may be applicable to a method of reducing damage to the pumps during the reverse torque operating condition.

Referring generally to FIGS. 1-7, a machine 10 may include a machine body 12 having a drivetrain 14 supported thereon for driving ground engaging elements 15 of the machine 10, such as, for example, front wheels 16 or rear wheels 18. According to the exemplary embodiment, the drivetrain 14 may include a torque converter 52 that is operably positioned between an internal combustion engine 20 and a transmission 54. The torque converter 52 may include a lockup clutch 60 and may have a locked configuration and an unlocked configuration. The internal combustion engine 20 may also provide power for one or more pumps, such as, for example, an implement pump 66, a fan pump 74, and an additional pump 82. The machine 10 also includes an electronic controller 58 in control communication with the internal combustion engine 20, the torque converter 52, and the pumps 66, 74, and 82.

During operation of the machine 10, there may be times when a resistive load of the drivetrain 14 becomes a load that drives the engine 20. For example, such a condition may result from deceleration, downshifting, or traveling with a grade. More specifically, for example, this condition may occur when the machine 10 is in gear and the weight of the load creates momentum sufficient to backload through the drivetrain 14 and increase the engine speed. This increased engine speed may be above the normal speed range for the engine 10 and may increase the speed of attached components, including the pumps 66, 74, and 82. The pump overspeed protection method 110 described herein may be executed by the electronic controller 58 to reduce overspeed conditions of one or more of the pumps 66, 74, and 82. As used herein, an "overspeed condition" may represent a condition in which one of the pumps 66, 74, or 82, or other similar component, is operated above a desired speed range. Such an overspeed condition may cause damage to the pump 66, 74, or 82 and/or may reduce the life of the pump 66, 74, or 82.

The pump overspeed protection method, described herein and shown in the flow diagram 110 of FIG. 3, includes a hierarchy of pump overspeed protection actions that function to reduce pump speed. Specifically, the disclosed method includes monitoring pump speed, at Box 114, and initiating a first action of the hierarchy of pump overspeed protection actions if the pump speed is greater than a first speed threshold. For example, the method may initiate a first pump control action, such as, for example, a fan pump algorithm, at Box 118, if the pump speed is greater than the first speed threshold. The fan pump algorithm, shown in the flow diagram 150 of FIG. 4, may include increasing the displacement of the fan pump 74. The displacement may be increased, as pump speed increases, until the fan pump 74 is at a maximum displacement.

A second action of the hierarchy of pump overspeed protection actions is initiated, in addition to the first action, if the pump speed is greater than a second speed threshold. For example, the disclosed method may initiate a second pump control action, such as, for example, an implement pump algorithm, at Box 122, if the pump speed is greater than the second speed threshold. The implement pump algorithm, shown in the flow diagram 190 of FIG. 6, may include increasing the displacement of the implement pump 66, and any additional implement pumps. The displacement may be increased, according to the algorithm, as pump speed increases, until the implement pump 66 is at a maximum displacement. The method may also provide a first operator warning when the pump speed exceeds the second speed threshold, as described above.

A third action of the hierarchy of pump overspeed protection actions is initiated, in addition to the first action and the second action, if the pump speed is greater than a third speed threshold. For example, the disclosed method may include a torque converter control action, which may include moving the torque converter 52 from the locked configuration to the unlocked configuration if the pump speed exceeds a third speed threshold. According to the exemplary method, the torque converter 52 may also be moved from the locked configuration to the unlocked configuration if the pump speed is above the second speed threshold and hydraulic oil temperature is above a fluid temperature threshold for a predetermined period of time. The torque converter 52 may also be moved to the unlocked configuration if the pump speed exceeds a reduced third speed threshold for a predetermined period of time.

A second operator warning may also be provided. According to the exemplary embodiment, the second operator warning may be provided when the pump speed is greater than the second speed threshold and the hydraulic oil temperature is greater than the fluid temperature threshold. The second operator warning may also be provided if the pump speed exceeds the reduced third speed threshold. Of course, the operator warnings may be provided at alternative times and may correspond to performance of alternative actions within the hierarchy of pump overspeed protection actions.

The pump overspeed protection method described herein includes the automatic performance of a hierarchy of pump overspeed protection actions to reduce potential damage to engine driven pumps 66, 74, and/or 82 during an overspeed condition. Specifically, the method includes diverting a portion of reverse torque transmitted through the drivetrain 14 to one or more of pumps 66, 74, and 82 as pump speed increases. According to the exemplary embodiment, this may be accomplished by increasing displacement of the fan pump 74 at a first threshold and increasing displacement of one or more implement pumps 66 at a second speed threshold. If the pump speed continues to increase above a third speed threshold, another portion of the reverse torque may be absorbed using the torque converter 52 in a third action. Specifically, the lock-up clutch 60 may be disengaged to reduce the load that is driving the internal combustion engine 20.

The method also includes a plurality of component protection algorithms operable to protect components affected by performance of the hierarchy of pump overspeed protection actions. Specifically, for example, during execution of the fan pump algorithm, hydraulic oil temperature may be monitored and, if the temperature is too low, the fan pump algorithm will not be performed and the fan pump 74 will remain at or return to an original displacement. In addition, during execution of the implement pump algorithm, hydraulic oil temperature may be monitored and, if the temperature is too high, the implement pump algorithm will not be performed and the implement pump 66 will remain at or return to an original displacement. If the component protection algorithms inhibit performance of one or more of the hierarchy of pump overspeed protection actions, the other actions of the method may still be performed, as conditions dictate. Although specific component protection algorithms are described herein, any algorithm for monitoring a condition of a component altered by one of the hierarchy of pump overspeed protection actions may be incorporated into the pump overspeed protection method of the present disclosure. Further, depending on the specific component condition being monitored, it may be desirable to alter performance of an action rather than inhibit performance.

Although the method disclosed herein is described with respect to a pump, it should be appreciated that the method may be used to protect the engine and/or other engine driven components from overspeed conditions. For example, the speed thresholds may correspond to specific speed thresholds of the one or more components being protected. According to some applications, the method may be configured to protect the component having the lowest speed threshold or limit. As such, the engine and engine driven components may be protected from damage caused by overspeed conditions. It should also be appreciated that the disclosed overspeed protection strategy results in increased machine retarding, thus reducing the usage and wear of machine brakes in instances where the drive elements become a resistive load driving the engine.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine having a pump overspeed protection system operating thereon, comprising:
    an internal combustion engine;
    a plurality of ground engaging elements;
    a drivetrain coupling the internal combustion engine and the ground engaging elements, wherein the drivetrain includes a torque converter having a locked configuration and an unlocked configuration;
    a plurality of pumps driven by the internal combustion engine; and
    an electronic controller in communication with the internal combustion engine, the torque converter, and the plurality of pumps, wherein the electronic controller is configured to determine a pump speed of a first pump of the plurality of pumps, initiate a first action of a hierarchy of pump overspeed protection actions if the pump speed exceeds a first speed threshold, initiate a second action of the hierarchy of pump overspeed protection actions if the pump speed exceeds a second speed threshold, initiate a third action of the hierarchy of pump overspeed protection actions if the pump speed exceeds a third speed threshold, and monitor a condition of a component altered by at least one of the hierarchy of pump overspeed protection actions;
    wherein at least one of the hierarchy of pump overspeed protection actions includes increasing a displacement of at least one of the plurality of pumps and at least another of the hierarchy of pump overspeed protection actions includes moving the torque converter from the locked configuration to the unlocked configuration.

2. The machine of claim 1, wherein the first action includes a first pump control action, the second action includes a second pump control action, and the third action includes a torque converter control action.

3. The machine of claim 1, wherein the plurality of pumps includes a fan pump, and the first action includes increasing a displacement of the fan pump.

4. The machine of claim 3, further including a temperature sensor positioned to detect a hydraulic fluid temperature, wherein the electronic controller is configured to monitor the hydraulic fluid temperature and operate the fan pump at an unaltered displacement if the hydraulic fluid temperature is below an overcooled threshold.

5. The machine of claim 3, wherein the plurality of pumps includes an implement pump, and the second action includes increasing a displacement of the implement pump.

6. The machine of claim 5, further including a temperature sensor positioned to detect a hydraulic fluid temperature, wherein the electronic controller is configured to monitor the hydraulic fluid temperature and operate the implement pump at an unaltered displacement if the hydraulic fluid temperature is above an overheated threshold.

7. The machine of claim 6, wherein the electronic controller is further configured to:
    determine if an operator command condition associated with the implement pump is true or false; and
    operate the implement pump at the unaltered displacement if the operator command condition is true.

8. The machine of claim 5, wherein the third action includes moving the torque converter from the locked configuration to the unlocked configuration.

9. The machine of claim 5, further including a temperature sensor positioned to detect a hydraulic fluid temperature, wherein the electronic controller is further configured to move the torque converter from a locked configuration to the unlocked configuration if the pump speed exceeds the second speed threshold and the hydraulic fluid temperature exceeds a fluid temperature threshold for a predetermined period of time.

10. The machine of claim 1, further including an operator display, wherein the electronic controller is further configured to display an operator message on the operator display corresponding to a performance of at least one of the hierarchy of pump overspeed protection actions.

11. A pump overspeed protection method configured for operation on a machine, the machine including an internal combustion engine, a plurality of ground engaging elements, a drivetrain coupling the internal combustion engine and the ground engaging elements, wherein the drivetrain includes a torque converter having a locked configuration and an unlocked configuration, a plurality of pumps driven by the internal combustion engine, and an electronic controller, the method comprising the steps of:
electronically determining a pump speed of a first pump of the plurality of pumps using the electronic controller;
electronically initiating a first action of a hierarchy of pump overspeed protection actions if the pump speed exceeds a first speed threshold using the electronic controller;
electronically initiating a second action of the hierarchy of pump overspeed protection actions if the pump speed exceeds a second speed threshold using the electronic controller;
electronically initiating a third action of the hierarchy of pump overspeed protection actions if the pump speed exceeds a third speed threshold using the electronic controller; and
electronically monitoring a condition of a component altered by at least one of the hierarchy of pump overspeed protection actions using the electronic controller;
wherein at least one of the hierarchy of pump overspeed protection actions includes increasing a displacement of at least one of the plurality of pumps and at least another of the hierarchy of pump overspeed protection actions includes moving the torque converter from the locked configuration to the unlocked configuration.

12. The pump overspeed protection method of claim 11, wherein the first electronically initiating step includes electronically initiating a first pump control action, the second electronically initiating step includes electronically initiating a second pump control action, and the third electronically initiating step includes electronically initiating a torque converter control action.

13. The pump overspeed protection method of claim 11, further including increasing a displacement of a fan pump in response to the step of electronically initiating the first action.

14. The pump overspeed protection method of claim 13, wherein the electronically monitoring step includes:
electronically monitoring a hydraulic fluid temperature; and
operating the fan pump at an unaltered displacement if the hydraulic fluid temperature is below an overcooled threshold.

15. The pump overspeed protection method of claim 13, further including increasing a displacement of an implement pump in response to the step of electronically initiating the second action.

16. The pump overspeed protection method of claim 15, wherein the electronically monitoring step includes:
electronically monitoring a hydraulic fluid temperature; and
operating the implement pump at an unaltered displacement if the hydraulic fluid temperature is above an overheated threshold.

17. The pump overspeed protection method of claim 16, further including:
determining if an operator command condition associated with the implement pump is true or false; and
operating the implement pump at the unaltered displacement if the operator command condition is true.

18. The pump overspeed protection method of claim 15, further including moving the torque converter from the locked configuration to the unlocked configuration in response to the step of electronically initiating the third action.

19. The pump overspeed protection method of claim 15, further including:
electronically monitoring a hydraulic fluid temperature; and
moving the torque converter from the locked configuration to the unlocked configuration if the pump speed exceeds the second speed threshold and the hydraulic fluid temperature exceeds a fluid temperature threshold for a predetermined period of time.

20. A machine having a pump overspeed protection system operating thereon, comprising:
an internal combustion engine;
a plurality of ground engaging elements;
a drivetrain coupling the internal combustion engine and the ground engaging elements, wherein the drivetrain includes a torque converter having a locked configuration and an unlocked configuration;
a plurality of pumps driven by the internal combustion engine; and
an electronic controller in communication with the internal combustion engine, the torque converter, and the plurality of pumps, wherein the electronic controller is configured to determine a pump speed of a first pump of the plurality of pumps, increase a displacement of a fan pump if the pump speed exceeds a first speed threshold, increase a displacement of an implement pump if the pump speed exceeds a second speed threshold, and move the torque converter from the locked configuration to the unlocked configuration if the pump speed exceeds a third speed threshold.

* * * * *